United States Patent [19]

Banba et al.

[11] 4,311,122
[45] Jan. 19, 1982

[54] DIRECT INJECTION TYPE DIESEL ENGINE

[75] Inventors: Tosio Banba, Takatsuki; Katsuyuki Morichika, Itami; Tetsuya Nakanishi, Kawanishi, all of Japan

[73] Assignee: Yanmar Diesel Engine Co., Ltd., Osaka, Japan

[21] Appl. No.: 148,534

[22] Filed: May 9, 1980

[30] Foreign Application Priority Data

May 17, 1979 [JP] Japan ................................. 54-61322

[51] Int. Cl.$^3$ ............................................. F02B 3/00
[52] U.S. Cl. .................................................. 123/279
[58] Field of Search ............................. 123/279, 281

[56] References Cited

U.S. PATENT DOCUMENTS

| | | | |
|---|---|---|---|
| 2,205,493 | 6/1940 | Saurer | 123/279 |
| 4,164,913 | 8/1979 | Komiyama | 123/279 |
| 4,207,843 | 6/1980 | List | 123/279 |

Primary Examiner—Ronald B. Cox
Attorney, Agent, or Firm—Norbert P. Holler

[57] ABSTRACT

A direct injection type diesel engine including a piston having a toroidal combustion chamber wherein the ratio of the diameter of the opening of the combustion chamber to the diameter of the piston, the ratio of the diameter of the opening of the combustion chamber to the depth of the combustion chamber, the ratio of the distance between the top of a toroid of the combustion chamber and the surface of the opening of the combustion chamber to the depth of the combustion chamber and the angle of inclination of a peripheral wall of the combustion chamber with respect to the axis of the piston are each in a predetermined range of values. By these features, the problems with regard to noise and coloring of the exhaust emissions can be obviated without adversely affecting the performance of the engine.

1 Claim, 7 Drawing Figures

DIRECT INJECTION TYPE DIESEL ENGINE

This invention relates to improvements in or relating to a combustion chamber of a direct injection type diesel engine, particularly of a direct injection type diesel engine provided with a toroidal combustion chamber.

Combustion chambers of 4-cycle diesel engines can be classified into a single chamber type or direct injection type and a double chamber type. The latter can be further classified into a precombustion chamber type, a swirl chamber type and an air cell type. The former offers the advantages that the configuration of the combustion chamber is simpler, lower in thermal loss and lower in the consumption rate of fuel than other types, so that it is suitable for use in an age in which energy conservation is a primary requirement. On the other hand, this type of engine suffers the disadvantage that it produces large noise, particularly noise of combustion, because it requires a high fuel injection pressure (200-700 kg/cm$^2$). To cope with this situation, it is desirable to retard the beginning of fuel injection as much as possible, but when this measure is adopted the performance of the engine is adversely affected and especially coloring of exhaust emissions becomes objectionable.

This invention obviates the aforesaid disadvantages of a diesel engine of the direct injection type provided with a piston having a toroidal combustion chamber by improving the configuration of its combustion chamber.

The essentials of the invention reside in that the contradictions in how to retard the beginning of the injection of the fuel while causing no increase in the rate of consumption of the fuel, no reduction in the developed power and no increase in the coloring of the exhaust emissions are eliminated by forming the toroidal combustion chamber such that the ratio of the diameter of the opening of the toroidal combustion chamber to the diameter of the piston, the ratio of the diameter of the opening of the toroidal combustion chamber to the depth of the combustion chamber, the ratio of the distance between the top of the toroid and the surface of the opening of the combustion chamber to the depth of the combustion chamber, and the angle of inclination of the peripheral wall of the combustion chamber with respect to the axis of the piston are respectively within predetermined ranges of values. The invention is capable of avoiding, without deteriorating the performance of the engine, an abnormal rise in the internal pressure of the cylinder which may be said to be a fatal defect of direct injection type diesel engines, thereby increasing the durability of the engine and reducing the combustion noise level (by over 4 decibels). Another advantage of the invention is that the tolerance of the engine is increased with respect to changes in the timing of fuel injection, so that variations in engine performance due to this cause can be reduced. An added advantage is that since the combustion chamber is simple in configuration and can be produced by casting, production cost can be reduced.

The inventors have conducted research and experiments with a view to solving the aforesaid problems and have found that if the ratio of the diameter of the opening of the toroidal combustion chamber to the diameter of the piston, the ratio of the diameter of the opening of the toroidal combustion chamber to the depth of the combustion chamber and the ratio of the distance between the top of the toroid of the combustion chamber and the surface of the opening of the combustion chamber to the depth of the combustion chamber are each set at a predetermined range of values and if the peripheral wall of the combustion chamber is inclined at a predetermined range of degrees with respect to the axis of the piston, then sudden combustion of the fuel unexpectedly occurs immediately after the piston has passed the top dead center (hereinafter referred to as TDC). As a result, a maximum rate of rise in pressure in the cylinder $(dp/dQ)max$, where p is the internal pressure of the cylinder, Q is the angle of the crank shaft and $dp/dQ$ is the ratio of a rise of the internal pressure of the cylinder to the unit crank shaft angle, can be reduced and the noise level can also be reduced. It has also been found that a maximum gas pressure also shows a reduction and no loss in power is caused.

A toroidal combustion chamber of the prior art has a toroid projecting into the chamber and is essentially based on the idea that the higher the intensity of squish and swirl streams produced in the chamber, the better will be the condition of mixing of atomized fuel with air.

A squish stream (hereinafter referred to as SQ) is a stream of air flowing into the toroidal combustion chamber as the air in the space above the piston is compressed by the rising piston. A swirl stream (hereinafter referred to as SW) refers to a stream flowing in vortical form in the cylinder during the suction stroke of the engine after being produced by a suction port of various known configurations, such swirl stream remaining in the compression and expansion strokes. In the diesel engine with which the present invention is concerned, the SW of course occurs and the SW and SQ naturally affect each other. However, to simplify the explanation, the SW and SQ would be treated as streams independent of each other and not losing their essential directionality even if they are turned into a composite stream. In the subsequent description of the invention, the SQ alone will be described while the SW is being left undiscussed.

In the toroidal combustion chamber of the prior art described hereinabove, the atomized fuel injected into an air current flowing in vortical form will merely flow in the direction of the air current for a predetermined period of time and no satisfactory mixing of the fuel with the air can be obtained until the vortical flow is disturbed, if the vortexes are oriented in a predetermined direction, no matter how strong the SQ and SW may be. Thus it has hitherto been necessary in a toroidal combustion chamber of the prior art to begin the injection of the fuel much earlier than the time the piston reaches the TDC. Another reason why it has hitherto been considered advisable to start the injection of the fuel rather early is that it has been believed that if the injection of the fuel is begun rather early it is possible to increase the period of time before the volume of the combustion chamber reaches a minimum, so that satisfactory mixing of the atomized fuel with the air can be obtained and at the same time combining of the atomized fuel with the molecules of oxygen is facilitated in a small space existing before the piston reaches the TDC whereby an abrupt combustion of the mixture would occur when the piston reaches the TDC. Conversely, it has been feared that if the beginning of the injection of the atomized fuel is delayed up to the time immediately before the piston reaches the TDC, the piston will pass the TDC and the volume of the combustion chamber will be increased while the mixing of the atomized particles with the air flowing in vortical form does not take place satisfactorily, thereby causing noncombustion in the combustion chamber. However, if satisfactory combustion occurs before the piston reaches the TDC, a sudden increase in pressure will be caused and the value of (dp/dQ)max will become too large before the volume of the combustion chamber is minimized. At the same time, the maximum pressure will also become excessively high, thereby adversely affecting the service life of the cylinder. Moreover, the pressure of the combustion gas produced in the chamber acts in a direction in which it interferes with the upward movement of the piston, so that it not only causes a reduction in the power developed but also causes noise and vibration to occur. Thus it is impossible to begin the injection of the atomized fuel at an early time without paying attention to other factors which may influence the performance of the engine. After all, the problems with regard to the toroidal combustion chamber of the prior art can be summed up as follows: the strong SQ produced when the piston is in its upward stroke does not change its direction of flow after the piston has passed the TDC, and satisfactory mixing occurs when the volume of the combustion chamber is relatively increased after the piston has begun its downward stroke, or stated differently, it takes a long period of time before satisfactory mixing of the atomized fuel with the air is obtained following injection of the atomized fuel.

The inventors have found that by setting the aforesaid ratios at predetermined ranges of values and tapering the peripheral wall of the combustion chamber, it is possible to cause the SQ to change its direction after the piston has passed the TDC, with a result that the energy of a positive SQ is damped by the energy of a negative SQ. Because of this phenomenon, satisfactory mixing of the atomized fuel with the air can be obtained even if beginning of the fuel injection is retarded.

The foregoing and still other advantages of the present invention will be made more apparent from the following detailed explanation of the preferred embodiment of the invention in connection with the accompanying drawings, in which.

Figure 5A:
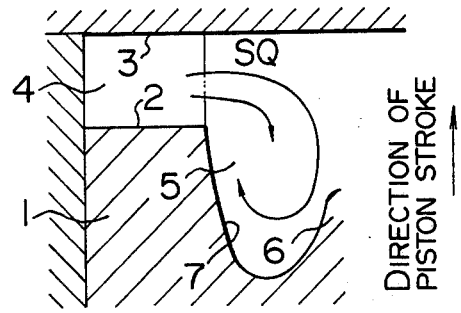
Figure 5B:
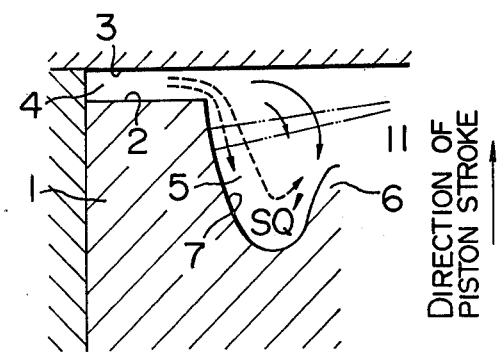
Figure 5C:
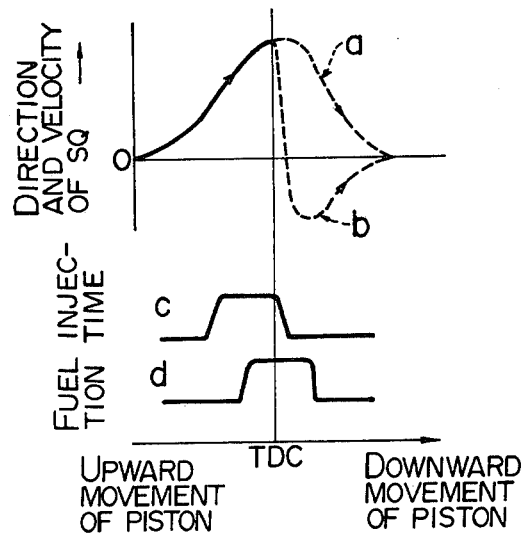

FIGS. 5a and 5b are views in explanation of the principle of causing a change in the direction of air currents in the combustion chamber by causing the peripheral wall of the combustion chamber to tilt with respect to the axis of the piston; and FIG. 5c is a graph in explanation of the relation between the piston stroke and the direction and velocity of SQ and the relation between the piston stroke and the beginning and duration of the injection of the atomized fuel in a toroidal combustion chamber of the prior art and the toroidal combustion chamber according to the invention.

Figure 1:
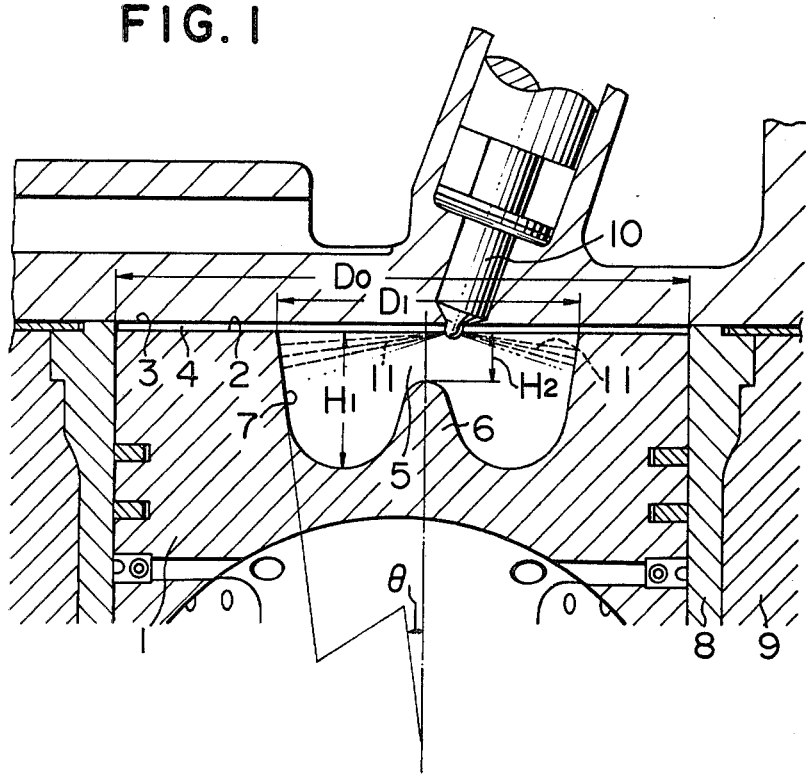
FIG. 1 is a schematic vertical sectional view of the combustion chamber of a direct injection type diesel engine comprising one embodiment of the invention.

A preferred embodiment of the invention will now be described by referring to the accompanying drawings. FIG. 1 shows in a sectional view an example of the combustion chamber of the direct injection type diesel engine according to the invention, comprising a piston 1, a piston head 2, a cylinder head 3, a clearance 4 between the piston head 2 and the cylinder head 3, a toroidal combustion chamber 5, a toroid 6, a peripheral wall 7 of the combustion chamber 5, a cylinder liner 8, a cylinder 9, a fuel injection nozzle 10, and atomized fuel 11 injected from the nozzle 10. In the figure, $D_1$ indicates the diameter of the opening of the combustion chamber 5, $D_0$ indicates the diameter of the piston 1, $H_1$ indicates the depth of the combustion chamber 5, and $H_2$ indicates the distance between the top of the toroid 6 and the surface of the opening of the combustion chamber 5. As can be seen in the figure, the peripheral wall 7 of the combustion chamber 5, which extends downwardly from the top of the piston to a juncture between the peripheral wall and the annular trough-shaped bottom wall of the chamber, is inclined uninterruptedly inwardly of the combustion chamber over the entire extent of the peripheral wall at an angle of inclination $\theta$ with respect to the axis of the piston 1.

The principle of causing the direction of an air current to change in the combustion chamber 5 by tilting the peripheral wall 7 of the combustion chamber 5 with respect to the axis of the piston 1 will be described by referring to FIGS. 5a and 5b.

In FIG. 5a showing the piston 1 moving upwardly toward the TDC, the air in the clearance 4 between the piston head 2 and the cylinder head 3 is rapidly compressed to form a SQ flowing in the normal direction.

Further upward movement of the piston 1 toward the TDC as shown in FIG. 5b produces a SQ' flowing in the reverse direction, and the energy of the SQ is damped while the two oppositely oriented air currents vigorously impinge against each other and the air is agitated. This agitation of the air continues for a while after the piston 1 has passed the TDC and begun to move downwardly.

FIG. 5c shows the direction of flow and the velocity of the SQ in relation to the stroke of the piston in the conditions shown in FIGS. 5a and 5b. In the figure, a curve a represents those in a toroidal combustion chamber of the prior art and a curve b indicates those in the combustion chamber according to the invention. As indicated by the curve b, the direction of the SQ is reversed when the piston passes the TDC and the speed of the SQ is markedly reduced after the passing of TDC by the piston in the combustion chamber 5 according to the invention. As indicated by a line d in FIG. 5c and shown in FIG. 5b, the injected fuel 11 is blown in atomized particles from the injection nozzle 10 into the air current in an agitated condition, so that mixing of the atomized fuel particles with the air can be achieved satisfactorily and combustion commences substantially at the time the piston 1 reaches the TDC. In a toroidal combustion chamber of the prior art, no agitation of the air current occurs as described hereinabove, so that it is necessary to produce a large amount of a combustible fuel-air mixture prior to commencement of combustion, thereby making it necessary to begin the fuel injection early as indicated by a line c in FIG. 5c. In the combustion chamber 5 according to the invention, the air current in the chamber 5 is brought to an agitated condition as the direction of the SQ is changed, thereby making it possible to obtain satisfactory combustion by retarding the beginning of the fuel injection as indicated by the line d in FIG. 5c. The fuel injection continues for a while following passing of the TDC by the piston 1, and diffusion of the atomized fuel throughout the cylinder is obtained so that good combustion at constant pressure takes place as the piston moves downwardly.

The most important moment in the aforesaid stroke of the piston 1 is the time at which the fuel injection is about to take place or has just taken place (FIG. 5b) after the pressure of the air in the cylinder 9 has reached a highest level. It has been ascertained by conducting various experiments that to obtain satisfactory results, it is necessary that not only the peripheral wall 7 of the combustion chamber 5 be inclined with respect to the axis of the piston 1, but also that the values of $D_1/D_0$, $D_1/H_1$ and $H_1/H_2$ be in the range between 0.45 and 0.6, 2.0 and 2.5 and 0.33 and 0.51 respectively, and that the angle of inclination $\theta$ of the peripheral wall 7 of the combustion chamber 5 with respect to the axis of the piston 1 be in the range between 5° and 20°.

Figure 2:
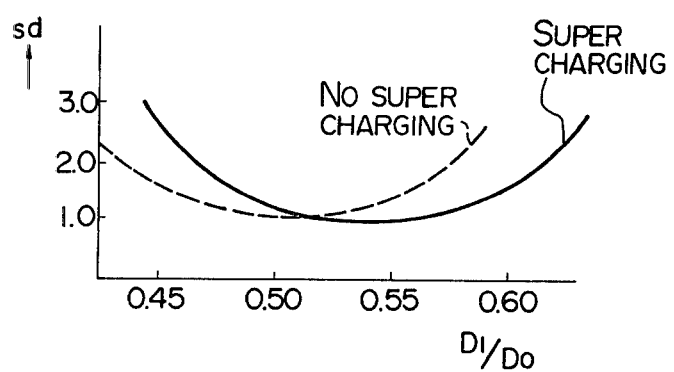
FIG. 2 is a graph showing changes in the ratio of the diameter of the opening of the combustion chamber to the diameter of the piston in relation to changes in the color of the exhaust emissions.

The results of these experiments will be described by referring to FIGS. 2-4. FIG. 2 shows changes in the value of $D_1/D_0$ in relation to the color of the exhaust emissions when $D_1/H_1 = 2.27$ (with no supercharging) or $D_1/H_1 = 2.42$ (with supercharging) with $\theta = 5°$. The Sd (smoke density) showing the color of the exhaust emissions represents the amount of carbon per unit volume which is determined by a Bosch density measuring method consisting in collecting a predetermined amount of the exhaust emissions through filter paper, and optically reading the area of the carbon adhering to the filter paper. Thus the value has no significance as an absolute value, although it is useful in comparing the results of tests relative to each other. It is shown that the Sd value is optimum when $D_1/D_0$ is in the range between 0.5 and 0.55 with or without supercharging. It will be seen that the Sd value shows a somewhat sudden increase when $D_1/D_0$ is below 0.47 or above 0.6 with supercharging and when it is below 0.45 or above 0.56 with no supercharging.

Figure 3:
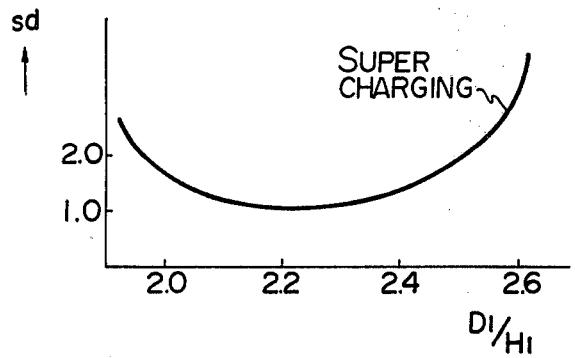
FIG. 3 is a graph showing changes in the ratio of the diameter of the opening of the combustion chamber to the depth of the combustion chamber in relation to changes in the color of the exhaust emissions.

FIG. 3 shows changes in the value of $D_1/H_1$ in relation to the color of the exhaust emissions when $\theta = 5°$ and $D_1/D_0 = 0.562$ (with supercharging). It is shown that the color of the exhaust emissions is lightest when $D_1/H_1$ is between 2.1 and 2.3 and becomes suddenly dark when it is below 2.0 or above 2.5.

As can be seen in the description of FIGS. 5a-5c, the angle of inclination $\theta$ of the peripheral wall 7 of the combustion chamber 5 with respect to the axis of the piston 1 (and hence the axis of the cylinder 9) is an important feature of the present invention.

Figure 4:
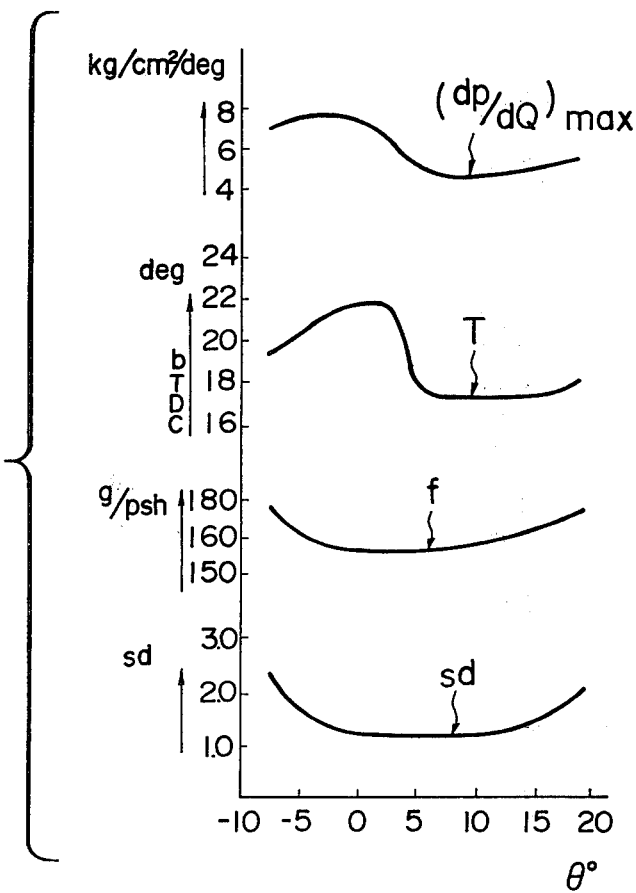
FIG. 4 is a graph showing changes in the angle of inclination of the peripheral wall of the combustion chamber with respect to the axis of the piston in relation to a maximum rate of rise in pressure in the cylinder, time of beginning of the fuel injection, and changes in the fuel consumption rate and the color of the exhaust emissions.

FIG. 4 shows a maximum rate of rise in pressure in the cylinder [(dp/dQ)max, unit=kg/cm²/deg], advance or retard of a fuel injection time T [crank angle of bTDC (before top dead center), unit=degree], a fuel consumption rate f (unit=g/psh) and changes in the color of the exhaust emissions (Sd) obtained by varying the angle of inclination $\theta$ over a wide range of between $-10$ and 20° when $D_1/D_0 = 0.562$ and $D_1/H_1 = 2.42$ with no supercharging. The characteristics (dp/dQ)max, f and Sd may vary depending on the fuel injection time T. Thus the fuel injection time T represents values which are optimum to obtain improvements in these characteristics by all accounts with respect to the angle of inclination $\theta$. From FIG. 4, one can make the following observations. (dp/dQ)max reaches a minimum when $\theta$ is about 7.5° and rises relatively slowly when $\theta$ increases on the positive side but rises suddenly when $\theta$ is below 3°. T shows a greatest delay when $\theta$ is about 7°, suddenly shows an advance when $\theta$ is about 4° and shows a slow advance when $\theta$ is about 17° or becomes higher. f reaches a minimum when $\theta$ is in the range between 0° and 5°. Sd, which reaches a minimum when $\theta$ is between 5° and 10°, shows a marked increase when $\theta$ becomes smaller than $-2°$ or larger than 12°. When the results of the tests are considered comperhensively, it will be evident that it is possible to reduce knocking, suppress noise and lighten the color of the exhaust emissions without causing a marked rise in the fuel consumption rate when $\theta$ is between 5° and 20°, preferably between 5° and 10°. It isadded that the angle of inclination $\theta$ of the peripheral wall of the toroidal combustion chamber of the prior art with respect to the axis of the piston is 0° or the peripheral wall is substantially at right angles to the piston head 2, and that $\theta$ is 3° at most when the draft for the piston casting is taken into consideration. In view of this point alone, it will readily be understood that the combustion chamber according to the invention is provided with a novel feature as compared with the prior art.

Moreover, the results of the experiments show that it is necessary to select a suitable value of $H_2/H_1$ to let a toroidal combustion chamber achieve the best results in operation. When the value is below 0.33, atomization of the fuel does not take place smoothly; and when the value is above 0.51, the SQ loses its violence. In either case, the arrangement fails to serve the purpose of the invention.

From the foregoing description, it will be appreciated that the present invention enables the beginning of the fuel injection to be retarded in a direct injection type diesel engine by improving the configuration of its combustion chamber, thereby solving various important problems including how to reduce noise, how to reduce the smoke density of the exhaust emissions, etc. The fact that the object of the invention is accomplished by a simple construction is conducive to enhancement of the value of the invention.

What is important in carrying the invention into practice is to select suitable values of the ratio of the diameter $D_1$ of the opening of the combustion chamber to the diameter $D_0$ of the piston and the ratio of the diameter $D_1$ of the opening of the combustion chamber to the depth $H_1$ of the combustion chamber. When suitable values are selected for these ratios, the ratio of the distance $H_2$ between the top of the toroid and the surface of the opening of the combustion chamber to the depth $H_1$ of the combustion chamber and the angle of inclination $\theta$ of the peripheral wall of the combustion chamber with respect to the axis of the piston can be determined secondarily.

The present invention has succeeded in reducing the noise level and density of the exhaust emissions, which have hitherto been considered defects of a direct injection type diesel engine, by a simple construction without adversely affecting the performance of the engine. The invention would be considered to be of high value in aiding in the advance of industry because the combustion chamber provided by the invention involves no increase in the cost of production of direct injection type diesel engines.

What is claimed is:

1. A direct injection type diesel engine including a piston having a toroidal combustion chamber, characterized in that said combustion chamber has a peripheral wall which extends downwardly from the top of said piston to a juncture between said peripheral wall and the bottom wall of said combustion chamber and is inclined uninterruptedly inwardly of said combustion chamber over the entire extent of said peripheral wall, the ratio of the diameter $D_1$ of the opening of said combustion chamber to the diameter $D_0$ of said piston is in the range between 0.45 and 0.6, the ratio of the diameter $D_1$ of the opening of said combustion chamber to the depth $H_1$ of said combustion chamber is in the range between 2.0 and 2.5, the ratio of the distance $H_2$ between the top of a toroid of said combustion chamber and the surface of the opening of said combustion chamber to the depth $H_1$ of said combustion chamber is in the range between 0.33 and 0.51, and the angle of inclination $\theta$ of the peripheral wall of said combustion chamber with respect to the axis of said piston is in the range between 5 and 20 degrees.

* * * * *